United States Patent [19]

Meyer

[11] Patent Number: 5,749,553
[45] Date of Patent: May 12, 1998

[54] DEFLECTOR MOUNTING

[75] Inventor: Willi Meyer, Effretikon, Switzerland

[73] Assignee: Emhart Glass Machinery Investments Inc., Wilmington, Del.

[21] Appl. No.: 505,091

[22] Filed: Jul. 21, 1995

[30] Foreign Application Priority Data

Jul. 21, 1994 [GB] United Kingdom ............... 9414740

[51] Int. Cl.$^6$ ............................................. A47F 5/00
[52] U.S. Cl. .................. 248/298.1; 248/913; 403/53; 108/20
[58] Field of Search ............... 65/303, 304, 325, 65/127; 248/913, 298.1; 403/53, 63, 80, 354; 74/490.13, 490.09; 108/20, 143, 147

[56]  References Cited

U.S. PATENT DOCUMENTS

| | | | |
|---|---|---|---|
| 1,399,176 | 12/1921 | Whittemore | 65/304 |
| 2,148,220 | 2/1939 | Ross | 65/304 |
| 3,046,006 | 7/1962 | Kulicke, Jr. | 248/913 |
| 3,517,624 | 6/1970 | Helms | 108/20 |
| 4,033,539 | 7/1977 | Bardocz | 248/228 |
| 4,700,584 | 10/1987 | Narishige et al. | 74/490.13 |
| 4,711,538 | 12/1987 | Ohs et al. | 248/298.1 |
| 4,934,643 | 6/1990 | Militano, Jr. | 248/286.1 |
| 5,040,431 | 8/1991 | Sakino et al. | 248/913 |

*Primary Examiner*—Leslie A. Braun
*Assistant Examiner*—Kimberly Wood
*Attorney, Agent, or Firm*—Spencer T. Smith

[57]  ABSTRACT

An adjustable mounting for a deflector of a trough assembly in a glass machine is adjustable in two perpendicular directions in a horizontal plane. More than one deflector may be used.

4 Claims, 2 Drawing Sheets

DEFLECTOR MOUNTING

This invention is concerned with mountings for deflectors of trough systems in glass ware forming machines.

BACKGROUND TO THE INVENTION

In the well known IS type of glass ware forming machines, a number (generally from 8 to 16) of individual sections of the same construction are mounted side by side and arranged to operate out of phase with each other so that a substantially continuous flow of formed glass ware is produced. Each section normally contains parison forming moulds and blow moulds and may be constructed to receive 1,2,3 or 4 gobs of molten glass at a time into a corresponding number of parison moulds, in which the gobs are formed into parisons, which parisons are then transferred to blow moulds and formed into the desired shape.

The gobs are supplied to the parison moulds through trough systems to which gobs are provided by a gob distributor. There is a trough system associated with each section, and the gob distributor is arranged to provide the required number of gobs to each trough system in turn through a number of scoops which are moved into alignment with upper end portions of the trough system.

Each trough system comprises, associated with each mould cavity of the section, an upwardly facing inclined trough which carries a gob from the scoop into a position above and to one side of the parison mould, and a downwardly facing deflector which deflects a gob travelling down the trough into a vertical path to fall into the cavity of the parison mould.

It is important that each gob is delivered to its parison mould accurately centrally of the mould cavity, and consequently it is necessary to be able to align the deflector with the mould cavity so that gobs are correctly delivered.

GB-B 2 249 089 discloses an adjustable mounting for a deflector of a trough assembly in a glass machine. This mounting comprises a carriage mounted in a frame of the machine which is capable of transverse adjustment and which comprises a longitudinally extending inclined support on which is mounted, for adjustment longitudinally of the support, a supporting assembly which supports the deflector. Position of the deflector may thus be adjusted by transverse adjustment of the carriage with respect to the machine frame and longitudinal adjustment of the trough with respect to the support of the carriage.

While this provides for adjustment of the deflector in two mutually perpendicular directions to align the deflector with a mould cavity, it suffers from the drawback that it is not readily adaptable for use with a plurality of deflectors in a multi gob machine; most I.S machines in use are multi gob, usually double or triple gob.

It is one of the objects of the present invention to provide an improved adjustable mounting for a deflector of a trough assembly which may be adapted for use in single or multi gob machines.

BRIEF STATEMENT OF THE INVENTION

The present invention provides an adjustable mounting for a deflector of a trough assembly in a glass machine wherein the position of a lower end portion of the deflector may be adjusted along two generally perpendicular axes, comprising a support adapted to be fixed in the machine to extend horizontally, a supporting assembly mounted on said support for sliding movement lengthwise of the support, said supporting assembly comprising a supporting block mounted on said support for sliding movement lengthwise of the support a supporting bracket mounted on said supporting block for movement transversely of said support, said bracket comprising means adapted to engage a deflector and locate it in position first adjusting means for adjusting the position of the supporting assembly lengthwise of the support and the supporting assembly comprising second adjusting means for adjusting the position of the supporting bracket transversely of said support.

The present invention also provides an adjustable mounting for a plurality of deflectors of a trough assembly in a multi gob glass machine wherein the position of a lower end portion of each deflector may be adjusted along two generally perpendicular axes comprising a support adapted to be fixed in the machine to extend horizontally a plurality of supporting assemblies corresponding to the plurality of deflectors, each supporting assembly being mounted on said support for sliding movement lengthwise of the support and comprising a supporting block mounted on said support for sliding movement lengthwise of the support a supporting bracket mounted on said supporting block for movement transversely of said support, said bracket comprising means adapted to engage a deflector and locate it in position first adjusting means for adjusting the position of each supporting assembly lengthwise of the support and each supporting assembly comprising second adjusting means for adjusting the position of its supporting bracket transversely of said support.

DESCRIPTION OF A PREFERRED EMBODIMENT

There now follows a description to be read with reference to the accompanying drawings of an adjustable mounting embodying the invention.

Figure 1:
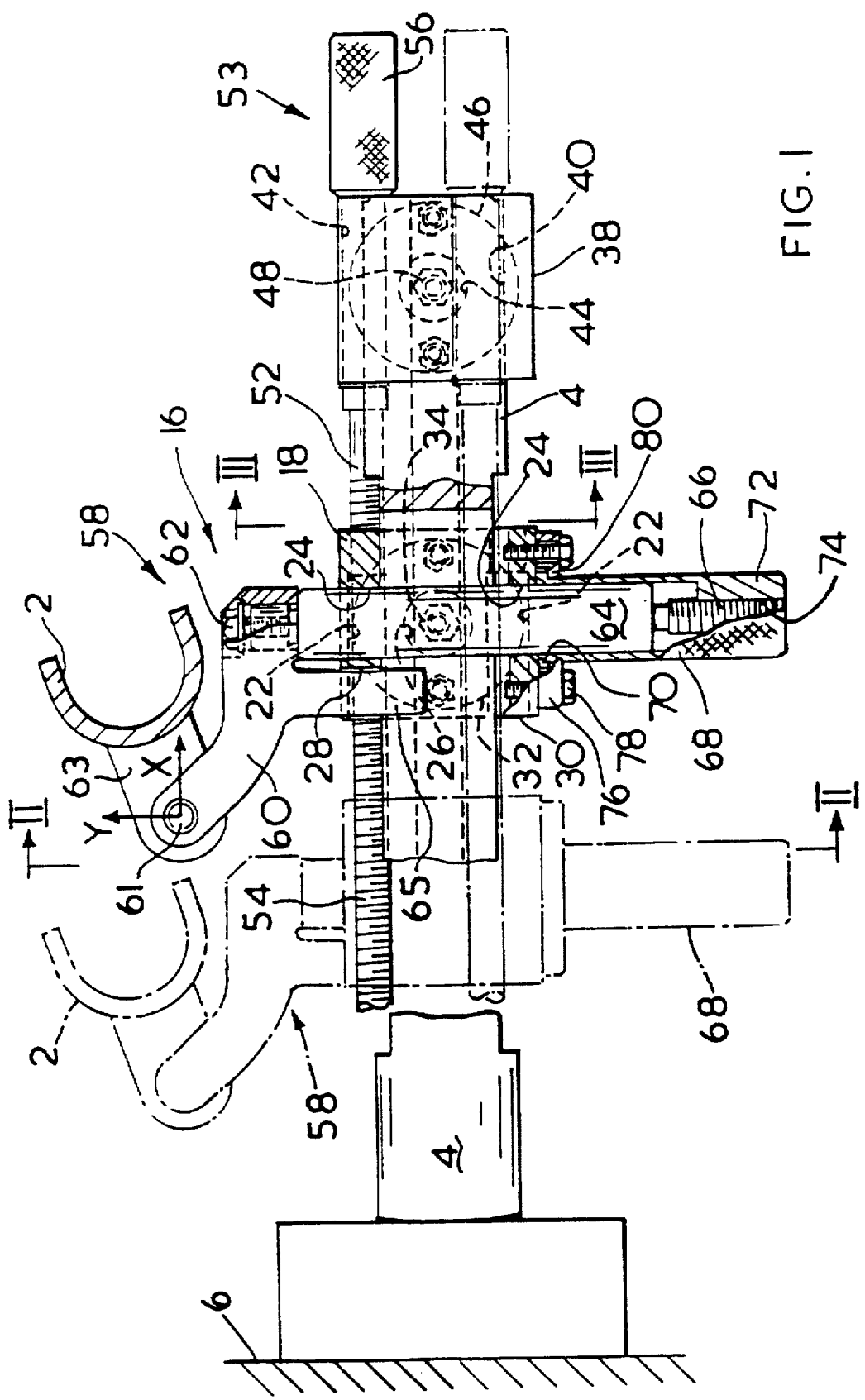
FIG. 1 shows a plan view of an adjustable mounting embodying the invention, with one deflector shown in position and another indicated in chain line.
Figure 2:
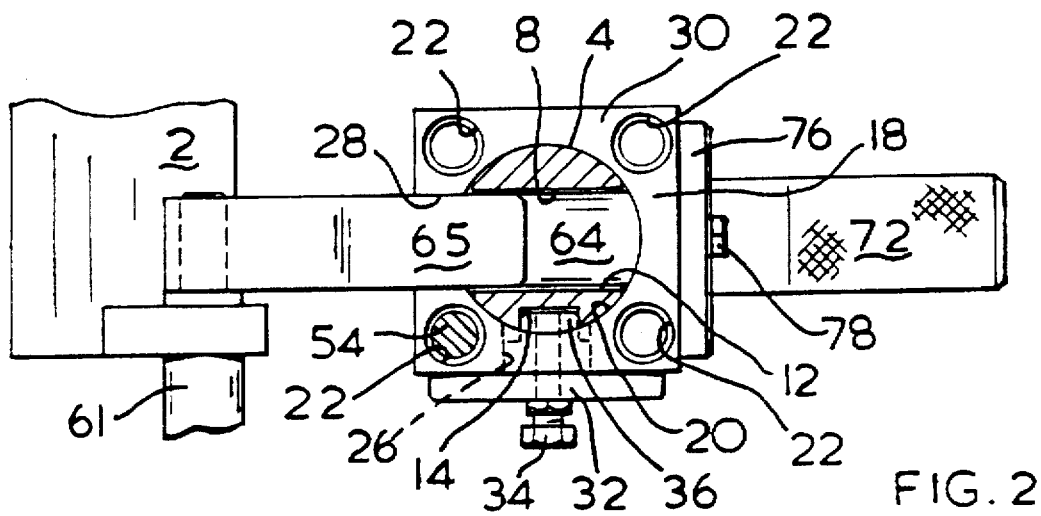
FIG. 2 shows a view taken in section along the line II—II of FIG. 1.

FIG. 1 shows an adjustable mounting for a deflector 2 of a trough assembly of an individual section of an IS machine. The mounting comprises a horizontally extending support 4 which is fixed to a frame member 6 of the machine. The support 4 is generally circular in cross section and is provided with a broad central slot 8 extending diametrically through the support 4 providing upper and lower flat horizontal surfaces 10, 12. The support 4 also comprises a downwardly facing axial recess 14.

Mounted on the support 4 are a number of supporting assemblies 16. Only one of these assemblies 16 is shown in detail in FIG. 1, while another is shown in chain line. The number of supporting assemblies 16 depends on the number of deflectors in the section. i.e. a single gob section will utilise one supporting assembly, a triple gob section will utilise three supporting assemblies.

Figure 4:
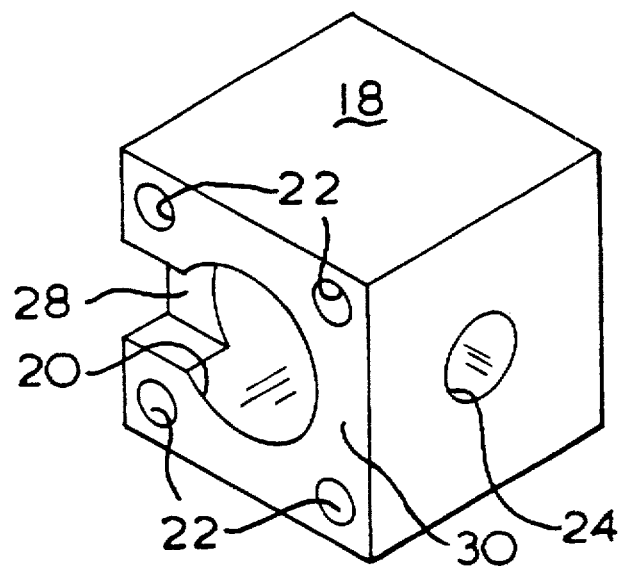
FIG. 4 shows a perspective view from underneath of a supporting block.

The supporting assembly 16 comprises a supporting block 18 generally in the shape of a cube (see FIGS. 1 and 4). The block 18 comprises a central bore 20 which fits slidably on the support 4. Parallel to the bore 20, symmetrically positioned in corner portions of the block 18 are four threaded bores 22. A transverse bore 24, of smaller diameter than the central bore 20, intersects the bore 20 perpendicularly and extends right through the block 18. Formed in a side face 30 of the block 18 is a parallel-sided recess 28 which extends to the bore 20 from a forward face of the block 20.

A plate 32 is secured to a bottom face of the block 18 and comprises an upstanding key 36 which extends through a short countersunk bore in the block 18 into the recess 14, and thus determines the radial orientation of the block 18 on the support 4. A bolt 34 extends through the key 36, and may be tightened to lock the block 18 in position on the support 14.

When the block 18 is positioned on the support 4, the bores 22 extend parallel to the axis of the support 4 and the recess 28 in the side face 30 is aligned with the slot 8.

Figure 3:
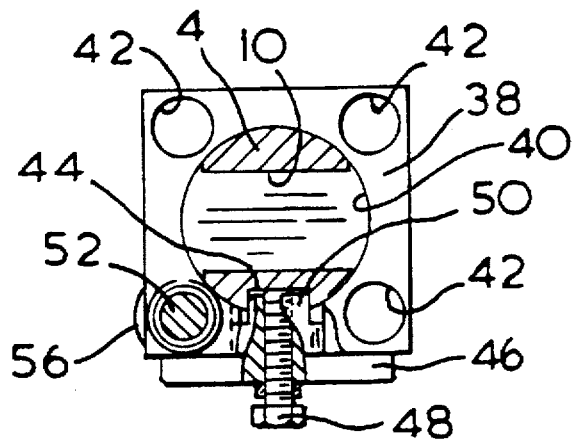
FIG. 3 shows a view taken in section along the line III—III of FIG. 1.

The mounting comprises first adjusting means 53 for adjusting the position of the supporting assembly 16 lengthwise of the support 4. The first adjusting means 53 comprises a stationary block 38 which is secured to the support 4. The block 38 (FIG. 3) is generally similar to the block 18. The block 38 is generally in the shape of a cube and comprises a central bore 40 which fits around the support 4. Parallel to the bore 40, symmetrically positioned corresponding to the bores 22 of the block 18, are four bores 42. A short countersunk bore 44 is formed in the lower face of the block 38 extending into the bore 40. Secured to a bottom face of the block 38 is a plate 46 which supports a key 50 which enters into the recess 14 of the support 4. A screw 48 is mounted in the key 50: by tightening the screw 48 the block 38 can be locked into position on the support 4.

The first adjusting means comprises a rod 52 which is mounted in one of the bores 42 so that it can rotate but not move axially with respect to the block 38, and extends parallel to the axis of the support 4. The rod 52 comprises a screw threaded end portion 54 which passes through one of the screw threaded bores 22 of the block 18. A helical wire insert (not shown) is located in this bore 22, and thus the insert engages with both the threads on the rod 52 and the threads of the bore 22. It can thus be seen that rotation of the rod 52 by means of a knurled head 56 will cause the block 18 to slide on the support 4 towards or away from the fixed, stationary, block 38.

The supporting assembly 16 also comprises a supporting bracket 58 which is mounted in the supporting block 18 for movement transversely of the support 4. The bracket 58 comprises a cranked portion 60 which supports a pin 61 which is adapted to engage in a hole in a lug 63 on the deflector 2 to locate the deflector 2 in its desired position. The cranked portion 60 is secured by a bolt 62 to one end portion of a cylindrical member 64 of the supporting bracket 58—a stabilising arm 65 of the cranked portion 60 extends into the recess 28 of the block 18.

The cylindrical member 64 is a sliding fit in the transverse bore 24 of the block 18 and extends through that bore and comprises a threaded end portion 66. The supporting assembly 16 comprises second adjusting means for adjusting the position of the supporting bracket 58 transversely of the support 4. A sleeve 68 surrounds an outwardly projecting portion of the member 64 and comprises a lip 70 towards one end and an end portion 72 towards the other end which has a threaded bore 74 which receives the threaded end portion 66. A ring 76 is secured to the block 18 by two screws 78 and comprises an inwardly facing lip 80 which overlies the lip 70.

The sleeve 68 may thus be rotated, but is restrained from axial movement by engagement of the lip 70 with the lip 80. Rotation of the sleeve 68 thus causes movement of the cylindrical member 64 transversely of the support 4, and consequently movement of the supporting bracket 58 and the pin 61.

It can thus be seen that the position of the pin 61, and thus of the deflector 2, can be adjusted in the X direction (viewing FIG. 1) by means of the knurled head 56, and in the Y direction by means of the sleeve 68.

A second supporting assembly 16, which is required for use in a double gob section having two deflectors 2, is shown in chain line. Adjustment of the supporting bracket 58 of this assembly 16 is effected by a sleeve 68. The first adjusting means for adjusting the position of the second assembly 16 lengthwise of the support 4 comprises a rod 52 (shown in chain link line) which extends, in the same manner as the rod 52 of the first assembly, through one of the bores 42 of the stationary block 38, extends through one of the threaded bores 22 of the first assembly 16 [through which it passes freely as no threaded insert is included in that bore 22] and comprises a screw threaded end portion which engages a helical wire insert in a threaded bore 22 of the block 18 of the second assembly. It can be seen that adjustment of the second assembly can be carried out in a manner strictly analogous to the manner in which the first assembly is adjusted.

It can be seen that, with the construction shown, a plurality of supporting assemblies (specifically up to four) can be provided, with each supporting assembly comprising first adjusting means for adjusting the position of the assembly, where each such first adjusting means comprises a rod which is rotatably mounted in the stationary block 38 and extends parallel to the support 4 while restrained against axial movement relative to the stationary block, such rod comprising a screw threaded portion which engages in a threaded bore in the block of said supporting assembly, the rods of each supporting member passing freely through any supporting block of a supporting assembly positioned between the supporting assembly and the stationary block.

What is more, the construction of each of the supporting blocks of each of the assemblies is of identical construction, the selective positioning of threaded inserts into bores 22 of the supporting blocks determining the threaded engagement between the bore 22 and the rod 52.

I claim:

1. An adjustable mounting for a deflector of a trough assembly in a glass machine, comprising an axially horizontally extending support, said axially extending support having an axially extending slot extending horizontally therethrough, a first supporting block mounted on said support for sliding movement lengthwise of said support, a first supporting bracket for supporting the deflector, means for mounting said first supporting bracket on said first supporting block with said bracket extending through said axially extending support slot for movement transversely of said support, first adjusting means for displacing said first supporting block lengthwise of said support, and second adjusting means for displacing said first supporting bracket transversely of said support.

2. An adjustable mounting for a deflector of a trough assembly in a glass machine according to claim 1, wherein there are a pair of deflectors further comprising
- a second supporting block mounted on said support for sliding movement lengthwise of said support,
- a second supporting bracket for supporting the second deflector,
- means for mounting said second supporting bracket on said second supporting block with said second supporting bracket extending through said axially extending support slot for movement transversely of said support,
- third adjusting means for displacing said second supporting block lengthwise of said support, and
- forth adjusting means for displacing said second supporting bracket transversely of said support.

3. An adjustable mounting for a deflector of a trough assembly in a glass machine according to claim 2, wherein said first and third adjusting means comprises
- a third supporting block fixed to said support with said first and second supporting blocks on one side thereof,
- a first rod rotatably supported by said third supporting block parallel to said support and interconnected with said first supporting block so that rotation of said first rod will displace said first supporting block lengthwise, and
- a second rod rotatably supported by said third supporting block parallel to said support and extending through said first supporting block, said second rod interconnected with said second supporting block so that rotation of said second rod will displace said second supporting block lengthwise.

4. An adjustable mounting for a deflector of a trough assembly in a glass machine according to claim 1, wherein said supporting bracket includes an arm and said supporting block includes a recess for receiving said arm for defining the orientation of said supporting bracket.

* * * * *